US012548908B2

(12) United States Patent

Varheenmaa et al.

(10) Patent No.: US 12,548,908 B2
(45) Date of Patent: Feb. 10, 2026

(54) ANTENNA APPARATUS

(71) Applicant: NOKIA TECHNOLOGIES OY, Espoo (FI)

(72) Inventors: Harri Varheenmaa, Helsinki (FI); Elmo Lepola, Espoo (FI); Pasi Yla-Oijala, Vantaa (FI); Anu Lehtovuori, Espoo (FI); Ville Viikari, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 7 days.

(21) Appl. No.: 18/714,983

(22) PCT Filed: Dec. 1, 2021

(86) PCT No.: PCT/EP2021/083692
§ 371 (c)(1),
(2) Date: May 30, 2024

(87) PCT Pub. No.: WO2023/098986
PCT Pub. Date: Jun. 8, 2023

(65) Prior Publication Data
US 2025/0047000 A1 Feb. 6, 2025

(51) Int. Cl.
*H01Q 9/04* (2006.01)
*H01Q 1/24* (2006.01)

(52) U.S. Cl.
CPC ............. *H01Q 9/045* (2013.01); *H01Q 1/245* (2013.01)

(58) Field of Classification Search
None
See application file for complete search history.

(56) References Cited

U.S. PATENT DOCUMENTS

| | | | | |
|---|---|---|---|---|
| 9,973,232 | B1 | 5/2018 | Kuo et al. | |
| 10,847,901 | B1 * | 11/2020 | Ayala Vazquez | H01Q 1/521 |

(Continued)

FOREIGN PATENT DOCUMENTS

| | | | |
|---|---|---|---|
| CN | 1482704 | A | 3/2004 |
| CN | 110120580 | A | 8/2019 |

OTHER PUBLICATIONS

Deshmukh et al., "Wideband Designs of Offset U-slot and Dual U-slot cut Rectangular Microstrip Antennas", 2021 International Conference on Nascent Technologies in Engineering (ICNTE 2021), (Jan. 2021), 6 pages.
International Search Report and Written Opinion for Patent Cooperation Treaty Application No. PCT/EP2021/083692 dated Aug. 19, 2022, 17 pages.
Khan et al., "User Influence on Mobile Terminal Antennas: A Review of Challenges and Potential Solution for 5G Antennas", IEEE Access, (Nov. 28, 2018), 21 pages.
Li et al., "A Zhong-Shaped Patch Antenna", 2018 IEEE International Conference on Signal Processing, Communications and Computing (ICSPCC), (Sep. 2018), 4 pages.

(Continued)

*Primary Examiner* — Wilson Lee
(74) *Attorney, Agent, or Firm* — ALSTON & BIRD LLP

(57) ABSTRACT

Certain examples of the present disclosure relate to and antenna apparatus. Certain examples provide an apparatus (10) comprising: an antenna radiator (101) having a first end (101$_{e1}$) and a second end (101$_{e2}$); a ground plane (200) spaced from the antenna radiator (101); a first feed element (102$_1$) and a second feed element (102$_2$); a first feed point (103$_1$) configured to couple a first radio frequency signal to the first end of the antenna radiator (101$_{e1}$) and the first feed element (102$_1$); a second feed point (103$_2$) configured to feed a second radio frequency signal to the second end of the antenna radiator (101$_{e2}$) and the second feed element (102)$_2$; wherein the first and second feed elements (102$_1$) (102$_2$) are configured to capacitively couple to the antenna radiator (101); and wherein the antenna radiator (101) comprises: a strip portion (101'), which extends from the first end (101$_{e1}$)

(Continued)

to the second end ($\mathbf{101}_{e2}$) of the antenna radiator (101), that is unbroken and devoid of slots; a plurality of slots ($\mathbf{104}_1$) on a first side ($\mathbf{101}_{s1}$) of the strip portion; and a plurality of slots ($\mathbf{104}_2$) on a second side ($\mathbf{101}_{s2}$) of the strip portion.

20 Claims, 8 Drawing Sheets

(56) References Cited

U.S. PATENT DOCUMENTS 11,011,824 B2 5/2021 Nishikawa et al.
2016/0190699 A1 6/2016 Yang et al.
2020/0313299 A1* 10/2020 Jia .......................... H01Q 5/378
2021/0151858 A1 5/2021 Wu et al.
2021/0175609 A1* 6/2021 Ryoo ....................... H01Q 9/42
2022/0328972 A1* 10/2022 Ryan ...................... H03H 7/185
2023/0029513 A1* 2/2023 Cai .......................... H01Q 1/44
2023/0318186 A1* 10/2023 Magill ................... H01Q 9/045
343/769
2023/0344132 A1* 10/2023 Wang ..................... H01Q 5/364
2024/0186705 A1* 6/2024 Wang ....................... H01Q 1/48

OTHER PUBLICATIONS

Sreelakshmi et al., "A Compact Grounded Asymmetric Coplanar Strip-Fed Flexible Multiband Reconfigurable Antenna for Wireless Applications", IEEE Access, (Oct. 26, 2020), 11 pages.
Zhang et al., "Design of Low-SAR Mobile Phone Antenna: Theory and Applications", IEEE Transactions on Antennas and Propagation, vol. 69, Issue 2, (Feb. 2021), 10 pages.

* cited by examiner a)
b)
c)
d)
e)

ANTENNA APPARATUS

CROSS-REFERENCE TO RELATED APPLICATIONS

The present application is a national phase entry of International Application No. PCT/EP2021/083692, filed Dec. 1, 2021, which is incorporated herein by reference in its entirety.

TECHNOLOGICAL FIELD

Examples of the present disclosure relate to antennas. Some examples, though without prejudice to the foregoing, relate to an antenna apparatus for mobile wireless communication devices.

BACKGROUND

Antennas and antenna systems are commonly used in telecommunication for transmitting and/or receiving radio waves in an operational range of frequencies (operational bandwidth).

Conventional mobile wireless communication devices, such as smart phones, require antenna systems that can cover multiple (possibly wide) frequency bands. Antennas for such mobile devices are typically provided in metal rim sections, e.g., at or proximal to a perimeter edge, of the mobile device.

Conventional antennas, not least such as those for mobile devices, are not always optimal.

In some circumstances it can be desirable to provide an alternative antenna design that may offer greater design freedom in the position of the antenna in a wireless communication device; for example, an antenna design that can be accommodated in non-conventional positions within the device—not least positions such as other than at or proximal to a perimeter edge of the mobile device.

In some circumstances it can be desirable to provide an alternative antenna design that can provide both high efficiency transmission output and a Specific Absorption Rate (SAR) which complies with international safety limits and standards.

The listing or discussion of any prior-published document or any background in this specification should not necessarily be taken as an acknowledgement that the document or background is part of the state of the art or is common general knowledge. One or more aspects/examples of the present disclosure may or may not address one or more of the background issues.

BRIEF SUMMARY

The scope of protection sought for various embodiments of the invention is set out by the claims.

According to various, but not necessarily all, examples of the disclosure there are provided examples as claimed in the appended claims. Any embodiments/examples and features described in this specification that do not fall under the scope of the independent claims are to be interpreted as examples useful for understanding various embodiments of the invention.

According to at least some examples of the disclosure there is provided an apparatus comprising:

an antenna radiator having a first end and a second end;

a ground plane spaced from the antenna radiator;

a first feed element and a second feed element;

a first feed point configured to couple a first radio frequency signal to the first end of the antenna radiator and the first feed element;

a second feed point configured to couple a second radio frequency signal to the second end of the antenna radiator and the second feed element;

wherein the first and second feed elements are configured to electromagnetically couple to the antenna radiator; and wherein the antenna radiator comprises:

- a strip portion, which extends from the first end to the second end of the antenna radiator, that is unbroken and devoid of slots;
- a plurality of slots on a first side of the strip portion; and
- a plurality of slots on a second side of the strip portion.

The following portion of this 'Brief Summary' section describes various features that can be features of any of the examples described in the foregoing portion of the 'Brief Summary' section. The description of a function should additionally be considered to also disclose any means suitable for performing that function.

In some but not necessarily all examples, a phase of the second radio frequency signal is configured to be:

different to a phase of the first radio frequency signal; and/or opposite to a phase of the first radio frequency signal.

In some but not necessarily all examples, an amplitude of the second radio frequency signal is configured to be the same as an amplitude of the first radio frequency signal.

In some but not necessarily all examples, an amplitude of the second radio frequency signal is configured to be different to an amplitude of the first radio frequency signal.

In some but not necessarily all examples, the apparatus comprises a central transverse axis and a central longitudinal axis, and wherein at least one from a group of the following is reflectionally symmetric about the central transverse axis and/or the central longitudinal axis:

the apparatus;

the antenna radiator;

the first and second feed elements;

the first and second feed points;

the plurality of slots; and the strip portion of the antenna radiator.

In some but not necessarily all examples, the apparatus comprises a central point thereof, and wherein at least one from a group of the following is rotationally symmetric about the central point:

the apparatus;

the antenna radiator;

the first and second feed elements;

the first and second feed points;

the plurality of slots; and the strip portion of the antenna radiator.

In some but not necessarily all examples, at least one of the first feed element and the second feed element:

respectively extends along a length of a first and a second edge of the antenna radiator;

is "I" shaped;

respectively extends along substantially half the perimeter of the antenna radiator; and/or is "U" shaped.

In some but not necessarily all examples, at least some of the plurality of slots are at least one from a group of:

"I" shaped;

"L" shaped;

"J" shaped;

"U" shaped; and meandering.

In some but not necessarily all examples, at least one or more of the plurality of slots are configured to be nested slots.

In some but not necessarily all examples, at least some of the plurality of slots define a plurality of nested loops of the antenna radiator.

In some but not necessarily all examples, the antenna radiator comprises a plurality of loops on the first side of the strip portion and a plurality of loops on the second side of the strip portion.

In some but not necessarily all examples, the plurality slots are non-conductive, wherein the plurality of loops are conductive, and wherein the conductive loops of the plurality of conductive loops are separated by non-conductive slots of the plurality of non-conductive slots.

In some but not necessarily all examples, the plurality of loops define a plurality of nested loops.

In some but not necessarily all examples, an outermost loop of the plurality of nested loops is "U" shaped.

In some but not necessarily all examples, a separation distance between an outermost loop of the plurality of nested loops and a second most outer loop of the plurality of nested loops is between $1/10^{th}$ and $1/100^{th}$ of a wavelength corresponding to a centre frequency of an operational range of frequencies of the apparatus.

In some but not necessarily all examples, a separation distance between an outermost loop of the plurality of nested loops and a feeding element is approximately equal to $1/100^{th}$ of a wavelength corresponding to a centre frequency of an operational range of frequencies of the apparatus.

In some but not necessarily all examples, a longitudinal dimension and/or a transverse dimension of the apparatus is approximately equal to half of a wavelength corresponding to a centre frequency of an operational range of frequencies of the apparatus.

In some but not necessarily all examples, the antenna radiator is a patch antenna and/or a microstrip antenna.

In some but not necessarily all examples, the antenna radiator is a planar conductor, the ground plane is a planar conductor, and a plane occupied by the planar conductor of the antenna radiator is parallel to a plane occupied by the planar conductor of the ground plane.

In some but not necessarily all examples, a separation distance between the ground plane and the antenna radiator is less than $1/10^{th}$ of a wavelength corresponding to a centre frequency of an operational range of frequencies of the apparatus.

In some but not necessarily all examples, the apparatus further comprises a further strip portion, which extends from a third end to a fourth end of the antenna radiator, that is unbroken and devoid of slots; wherein:

the apparatus comprises a central transverse axis and a central longitudinal axis, the strip portion extends along the central longitudinal axis, and the further strip portion extends along the central transverse axis.

In some but not necessarily all examples, the apparatus further comprises:

a third feed element and a fourth feed element;

a third feed point configured to couple a third radio frequency signal to a third end of the antenna radiator and the third feed element; and a fourth feed point configured to couple a fourth radio frequency signal to a fourth end of the antenna radiator and the fourth feed element;

wherein the third and fourth feed elements are configured to electromagnetically couple to the antenna radiator.

In some but not necessarily all examples, the ground plane is comprised in an energy storage device.

In some but not necessarily all examples, at least a part of the apparatus is positioned in a housing for a portable wireless communication device.

In some but not necessarily all examples, the apparatus is centrally positioned in the housing.

In some but not necessarily all examples, the antenna radiator is located towards a major surface of the housing.

In some but not necessarily all examples, the apparatus is non-centrally positioned in the housing.

In some but not necessarily all examples, there is provided a radio network access node or a portable electronic device comprising one or more apparatuses as claimed in any previous claim.

While the above examples of the disclosure and optional features are described separately, it is to be understood that their provision in all possible combinations and permutations is contained within the disclosure. Also, it is to be understood that various examples of the disclosure can comprise any or all of the features described in respect of other examples of the disclosure, and vice versa.

BRIEF DESCRIPTION OF THE DRAWINGS

Some examples will now be described with reference to the accompanying drawings in which.

Figure 1:
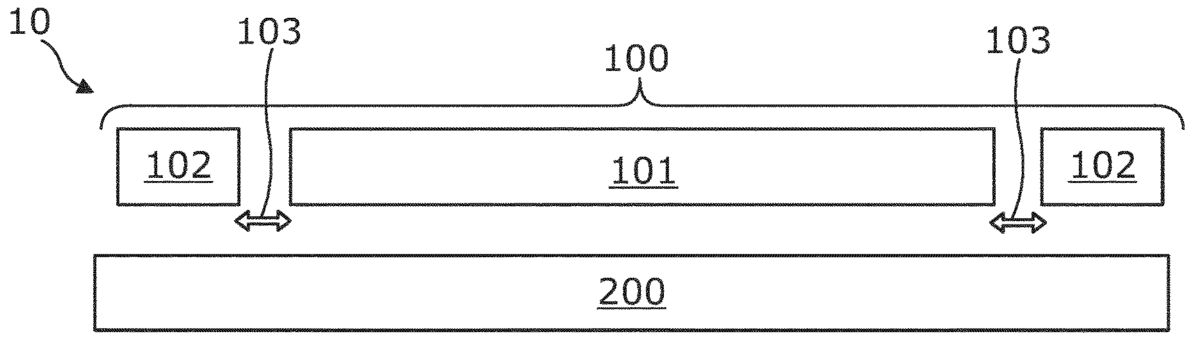
FIG. 1 shows an example of the subject matter described herein.

The figures are not necessarily to scale. Certain features and views of the figures can be shown schematically or exaggerated in scale in the interest of clarity and conciseness. For example, the dimensions of some elements in the figures can be exaggerated relative to other elements to aid explication. Similar reference numerals are used in the figures to designate similar features. For clarity, all reference numerals are not necessarily displayed in all figures.

In the drawings (and description) a similar feature may be referenced by the same reference numeral, i.e., three-digit number. In the drawings (and description), an optional subscript to the three-digit number can be used to differentiate different instances of similar features. Therefore, a three-digit number without a subscript can be used as a generic reference and the three-digit number with a subscript can be used as a specific reference. A subscript can comprise a single digit that labels different instances. A subscript can comprise two digits including a first digit that labels a group of instances and a second digit that labels different instances in the group.

DETAILED DESCRIPTION

The figures (with reference in particular to FIGS. 1 and 2) schematically illustrate, and the following description describes, various examples of the disclosure including an apparatus 10 comprising:

an antenna radiator 101 having a first end $\mathbf{101}_{e1}$ and a second end $\mathbf{101}_{e2}$;

a ground plane 200 spaced from the antenna radiator 101;

a first feed element $\mathbf{102}_1$ and a second feed element $\mathbf{102}_2$;

a first feed point $\mathbf{103}_1$ configured to couple a first radio frequency signal to the first end of the antenna radiator $\mathbf{101}_{e1}$ and the first feed element $\mathbf{102}_1$;

a second feed point $\mathbf{103}_2$ configured to feed a second radio frequency signal to the second end of the antenna radiator $\mathbf{101}_{e2}$ and the second feed element $\mathbf{102}_2$;

wherein the first and second feed elements $\mathbf{102}_1$ $\mathbf{102}_2$ are configured to capacitively couple to the antenna radiator 101; and wherein the antenna radiator 101 comprises:

a strip portion 101', which extends from the first end $\mathbf{101}_{e1}$ to the second end $\mathbf{101}_{e2}$ of the antenna radiator 101, that is unbroken and devoid of slots;

a plurality of slots $\mathbf{104}_1$ on a first side $\mathbf{101}_{s1}$ of the strip portion; and a plurality of slots $\mathbf{104}_2$ on a second side $\mathbf{101}_{s2}$ of the strip portion.

FIG. 1 schematically illustrates a cross-sectional side on view of an apparatus 10 according to the present disclosure. The apparatus 10 can be used to transmit and/or receive radio waves.

The apparatus comprises: an antenna radiator 101; a ground plane 200 spaced from the antenna radiator; first and second feed elements 102; and first and second feed points 103.

The first feed point (which may also be referred to as a first excitation port) is configured to couple a first radio frequency signal to a first end (not shown in FIG. 1) of the antenna radiator and the first feed element. The second feed point (which may also be referred to as a second excitation port) is configured to couple a second radio frequency signal to a second end (not shown in FIG. 1) of the antenna radiator and the second feed element. The coupling could be effected via a direct contact/galvanic connection and/or a non-contact/electromagnetic connection (i.e., to provide capacitive/inductive coupling/connection). The feed points may be coupled, via a coaxial cable (not shown), to a signal transmission circuit and/or a signal reception circuit. The signal transmission circuit and/or a signal reception circuit may be a radio frequency module or radio frequency circuitry for generating radio frequency signals for exciting the antenna or receiving radio frequency signals from the antenna.

In some examples, not least such as when the apparatus is used for transmission, a phase of the second radio frequency signal is configured to be different to a phase of the first radio frequency signal. Such a difference may correspond to a correlation between the phases of the first and second radio frequency signals being above a threshold, i.e., the phases differing from one another by an amount exceeding a threshold level, not least for example a difference of >1%, 5% or 10%. In some examples, a phase of the second radio frequency signal is configured to be opposite to a phase (e.g., 180 degrees/π radians out of phase) of the first radio frequency signal.

In some examples, not least such as when the apparatus is used for transmission, an amplitude of the second radio frequency signal is configured to be the same as an amplitude of the first radio frequency signal. The amplitudes being the same may correspond to a correlation between the amplitudes of the first and second radio frequency signals being below a threshold, i.e., values of the first and second amplitudes differing from one another by an amount within a threshold level, not least for example a difference of <1%, or 5%.

In some examples, not least such as when the apparatus is used for transmission, an amplitude of the second radio frequency signal is configured to be different to an amplitude of the first radio frequency signal.

The first and second feed points can correspond to respective first and second positions at which the antenna radiator and the respective feed element are coupled to radio frequency circuitry(ies) to convey the respective first and second radio frequency signals from/to the radio frequency circuitry(ies). Each radio frequency signal could be a radio frequency signal to be transmitted, or a received radio frequency signal). The radio frequency circuitry(ies) can be: receiver, transmitter and/or transceiver circuitry(ies), such as an Integrated Circuit (IC) or an amplifier. In some examples, a conductive track may run directly from the feed element(s) to one of the pins of an IC or an amplifier (the transmitter/transceiver). In some examples, other radio frequency circuitry (not least for example: filters, resistors/capacitors/inductors, and switches) may exist between the feed point and an amplifier or IC. In some examples, there may be a connector between each feed element and a circuit board, the circuit board (e.g., Printed Circuit Board (PCB) or Printed Wiring Board (PWB)) providing the conductive track to the amplifier/IC. Such a connector could be analogous to a port.

The first and second feed elements are configured to electromagnetically couple (i.e., capacitively couple and/or inductively couple) to the antenna radiator.

The antenna radiator is conductive/made of a conductive material. In some examples, the antenna radiator is a patch antenna and/or a microstrip antenna.

The antenna radiator comprises a strip portion (not shown in FIG. 1, but shown in FIG. 2 with reference to 101') extending from the first end to the second end of the antenna radiator. The strip portion is unbroken and devoid of slots. The antenna radiator also comprises a plurality of slots (not shown in FIG. 1, but shown in FIG. 2 with reference to $\mathbf{104}_1$) on a first side $\mathbf{101}_{s1}$ of the strip portion, and a plurality of slots (not shown in FIG. 1, but shown in FIG. 2 with reference to $\mathbf{104}_2$) on a second side $\mathbf{101}_{s2}$ of the strip portion.

The antenna radiator, first and second feed elements and first and second feed points may provide/define a patch antenna 100 for the apparatus.

The apparatus can be an antenna system used to transmit and/or receive radio waves.

The operational range of frequencies, i.e., an operational bandwidth or an operational resonant mode, of the apparatus/antenna system is a frequency range over which the antenna system can efficiently operate. An operational resonant mode (operational bandwidth) may be defined as where a return loss S11 of the antenna system is greater than an operational threshold, T, such as, for example, 3 or 4 dB and where a radiated efficiency (er) is greater than an operational threshold such as for example −3 dB in an efficiency plot. Radiation efficiency is the ratio of the power delivered to the radiation resistance of the antenna system (Rrad) to the total power delivered to the antenna system: er=(Rrad)/(RL+Rrad), where RL=loss resistance (which covers dissipative losses in the antenna system itself). It should be understood that "radiation efficiency" does not include power lost due to poor Voltage Standing Wave Ratio, VSWR (mismatch losses in the matching network which is not part of the antenna system as such, but an additional circuit). The "total radiation efficiency" comprises the "radiation efficiency" and power lost due to poor VSWR [in dB]. The efficiency operational threshold could alternatively be expressed in relation to "total radiation efficiency" rather than "radiation efficiency".

Further details, as well as various differing examples, of the patch antenna are discussed below and shown not least with respect to FIGS. 2 to 20 and 32 (which show top views of differing designs of patch antennas). As will be apparent from these FIGs, in various examples, one or more of:

the apparatus itself, the antenna radiator;

the first and second feed elements;

the first and second feed points;

the plurality of slots; and the strip portion of the antenna radiator as well as their relative arrangement is/are reflectionally symmetric and/or rotationally symmetric.

For instance, the apparatus (or patch) may have a central transverse axis and a central longitudinal axis, and may be reflectionally symmetric about the central transverse axis and/or the central longitudinal axis. In such a manner, each of the above listed parts may have a shape and relative position within the apparatus/patch so as to provide line symmetry, mirror symmetry, or mirror-image symmetry for the apparatus/patch.

Likewise, the apparatus (or patch) may have a central point thereof, and may be rotationally symmetric about the central point. In such a manner, each of the above listed parts may have a shape and relative position within the apparatus/patch such that the apparatus/patch is rotationally symmetrical.

It should be appreciated that the ground plane is the local ground (earth) of the antenna system. The term 'plane' does not necessarily mean that the ground plane is planar or flat.

In some examples, the antenna radiator and the ground plane are planar conductors (e.g., made of metal or any conductive material), and a plane occupied by the planar conductor of the antenna radiator is substantially parallel to a plane occupied by the planar conductor of the ground plane.

In the presently disclosed examples, the ground plane is substantially flat/planar and likewise the patch antenna (i.e., the antenna radiator as well as the first and second feed elements) is substantially flat/planar. Moreover, the ground plane is substantially parallel with the patch antenna. However, in some examples the ground plane and/or the patch antenna can be shaped so that at least one part of one or the other of the patch antenna and the ground plane are inconsistently spaced apart from one another. The shaping may allow the antenna radiator and/or the ground plane to conform to the shape of a part of an electronic device, e.g., a cover, a housing or an internal component (battery, display, etc). In some examples, at least a part of the major surface of the patch antenna and/or ground plane can be curved, i.e., so as to conform to a surface onto which the patch antenna/ground plane is respectively disposed. In some examples, the ground plane is comprised in an energy storage device, such as a battery, or housing thereof. In some examples, at least a part of the apparatus is positioned in a housing for a portable wireless communication device. In some examples, the apparatus is centrally positioned in the housing (i.e., as opposed to being positioned proximal to an edge of the housing). In some examples, the apparatus is non-centrally positioned in the housing. In some examples, the antenna radiator is located towards a major surface of the housing (e.g., proximal to, on, or in a back cover of a wireless communications device such as a smartphone).

In some examples, the apparatus is used for transmitting and/or receiving electromagnetic radiation at an operational range of frequencies, and a height dimension of the apparatus (i.e., a distance from the bottom of the ground plane to the top of the antenna radiator) is less than 1/10th of a wavelength corresponding to a centre frequency of the operational range of frequencies.

In some examples, the apparatus is provided in a radio network access node or a portable electronic device.

Reference will now be made to FIGS. 2 to 19, which show top views of differing designs of patch antennas, and which illustrate further details of the antenna radiator, first and second feed elements and the first and second feed points.

Figure 2:
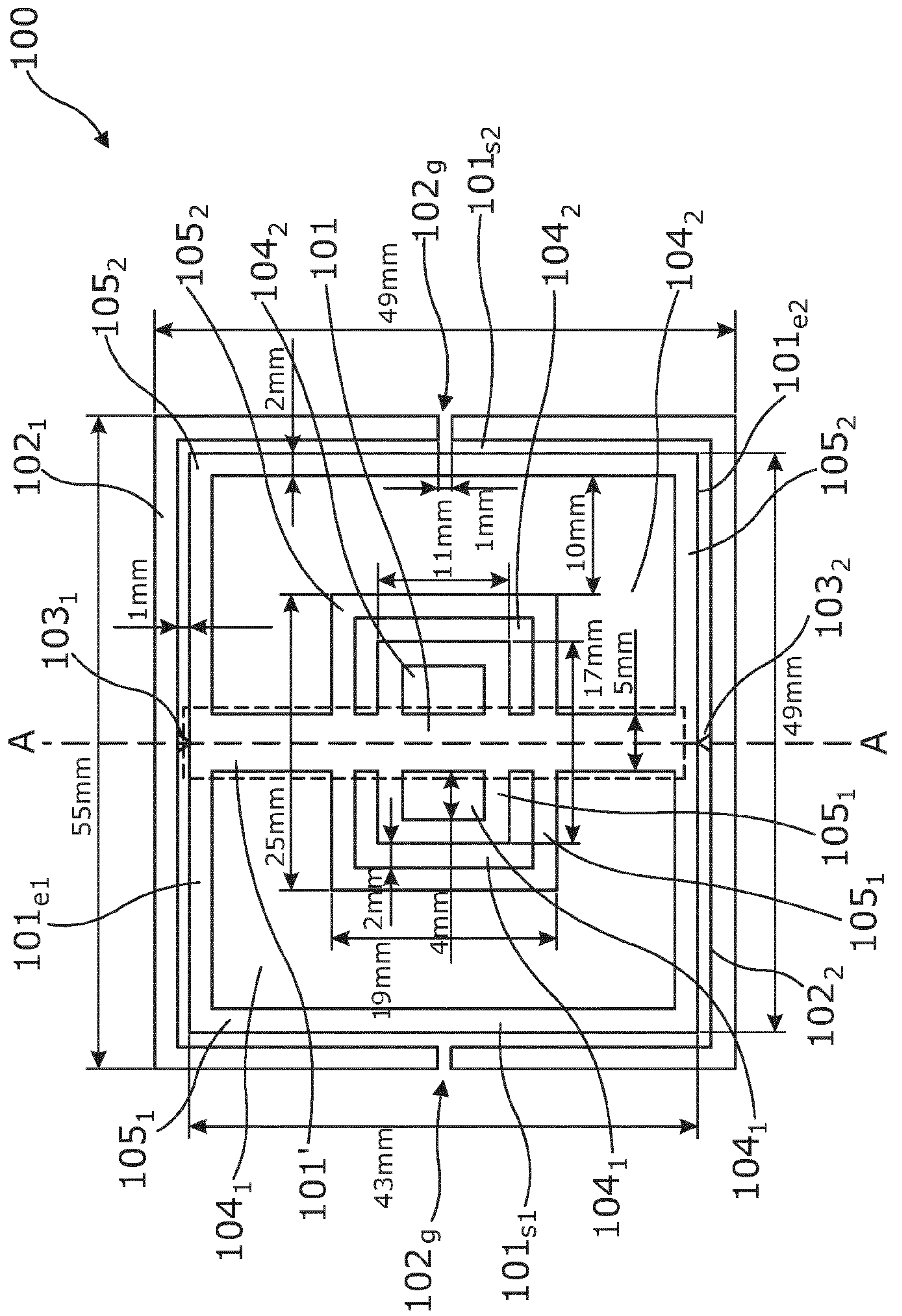
FIG. 2 shows another example of the subject matter described herein.

FIG. 2 illustrates an example of a patch antenna 100 for use with the apparatus 10 of FIG. 1. The description provided with reference to FIG. 1 is also relevant to FIG. 2.

In use, the patch antenna is separated from and overlapping the ground plane (not shown). The patch antenna is disposed proximal to the ground plane. In certain particular examples, the spacing/gap between the ground plane and the antenna radiator as well as the first and second feed elements is 1 mm. However, it is to be appreciated that other spacings can be used for a given particular operational frequency band or different operational frequency bands.

The patch antenna 100 comprises an antenna radiator 101 having a first end $\mathbf{101}_{e1}$ and a second end $\mathbf{101}_{e2}$ opposite to the first end. In this example, the antenna radiator is made of a conductive material.

In some examples, a longitudinal dimension and/or a transverse dimension of the apparatus is approximately equal to half of a wavelength corresponding to a centre frequency of an operational range of frequencies of the apparatus. Adjusting the overall dimensions of the apparatus, i.e., its longitudinal and transverse dimensions, affects the resonant frequency of the apparatus. Increasing the dimensions decreases the resonant frequency of the apparatus.

The patch antenna 100 also comprises a first feed element $\mathbf{102}_1$ disposed adjacent to, and co-planar with, the first end of the antenna radiator.

In this example, the first feed element is in the form of a "U" shaped planar conductive member. It is to be appreciated references to a "U" shape additionally encompass a sharp cornered/rectilinear U-shape, such as a "⊔" shape.

The patch antenna 100 also comprises a second feed element $\mathbf{102}_2$ disposed adjacent to, and co-planar with, the second end of the antenna radiator. Again, in this example, the second feed element is in the form of a "U" shaped planar conductive member. The first and second feed elements are configured to electromagnetically couple (i.e., capacitively couple and/or inductively couple) to the antenna radiator.

The first feed element extends along a length of a first (upper) edge of the antenna radiator. The first feed element further extends along a part (i.e., approximately half) of a length of each of the left and right side edges of the antenna radiator. In such a manner, the first feed element thereby provides a substantially "U" shaped member that partially encloses the antenna radiator, i.e., the first feed element surrounds approximately half of the antenna radiator. Similarly, the second feed element extends along a length of a second (lower) edge of the antenna radiator, wherein the first (upper) edge is opposite to the second (lower) edge, as well as a part (i.e., approximately half) of a length of each of the left and right side edges of the antenna radiator. The second feed element thereby partially encloses the other half of the antenna radiator.

Figure 9:
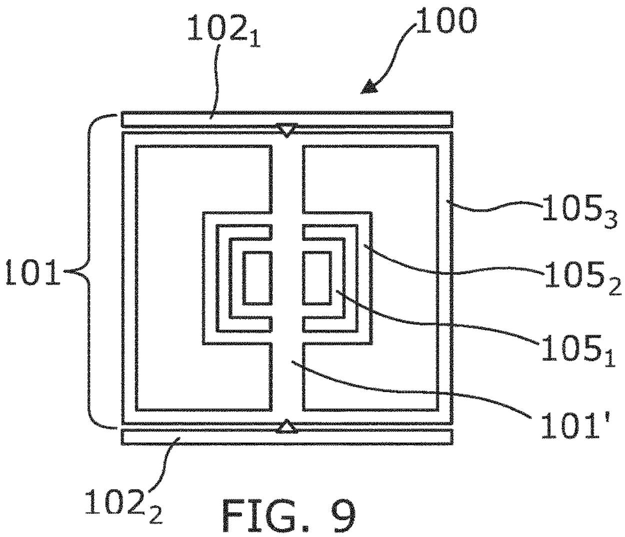
FIG. 9 shows another example of the subject matter described herein.

The first and second "U" shaped feed elements together substantially surround/enclose the antenna radiator providing a gap between the feed elements and the antenna radiator and also providing a gap $\mathbf{102}_g$ between the adjoining/proximal sections of the first and second feed elements. As will be appreciated, the dimension of the gap $\mathbf{102}_g$ between the adjoining/proximal sections of the first and second feed elements can be adjusted in differing implementations, which can adjust the matching of the antenna patch. The gap 102 can be narrow as per FIG. 2 (e.g., of the order of 1% of a wavelength corresponding to a centre frequency of an operational range of frequencies of the apparatus). In other examples, the gap can be wider, e.g., of the order of 5%, 10% 15% or 20% of a wavelength corresponding to a centre frequency of an operational range of frequencies of the apparatus. In some examples, the gap between adjoining/proximal sections of the first and second feed elements substantially corresponds to a dimension of the antenna radiator itself, i.e., the length of the antenna radiator, such that, in effect, there are no parts of the feed elements that extend along the sides $\mathbf{101}_{s1}$ and $\mathbf{101}_{s2}$ of the antenna radiator. In such a manner, the feed elements are "I" shaped, e.g., as shown in FIG. 9.

As will be appreciated, the antenna radiator may have any suitable shape, not least: substantially square, rectangular, non-rectilinear or curved (i.e., it is to be appreciated that one or more, or all, corners/lines of shapes could be straight or rounded).

As will be appreciated, the feed elements may have any suitable shape that at least partly conforms to the shape of the antenna radiator (e.g., so as to conform to an edge of the antenna radiator) not least: "U" shaped (as per FIG. 2), "I shaped" (as per FIG. 9).

Yet furthermore, the patch antenna 100 comprises a first feed point $\mathbf{103}_1$ configured to couple a first radio frequency signal to both the first end $\mathbf{101}_{e1}$ of the antenna radiator and the first feed element $\mathbf{102}_1$. Similarly, the patch antenna 100 also comprises a second feed point $\mathbf{103}_2$ configured to couple a second radio frequency signal to both the second end $\mathbf{101}_{e2}$ of the antenna radiator and the second feed element $\mathbf{102}_2$.

Figure 8:
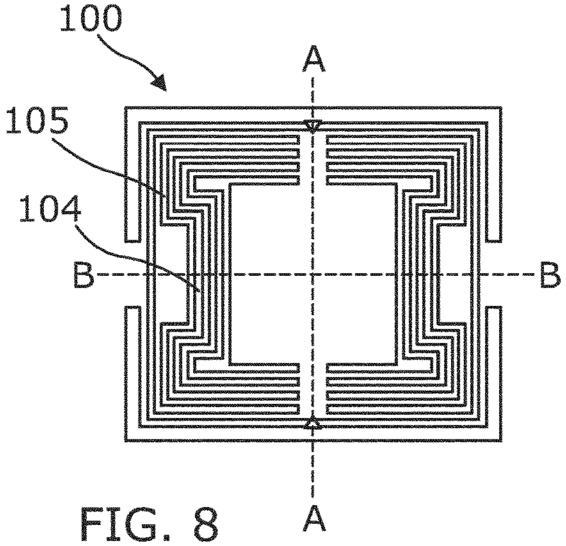
FIG. 8 shows another example of the subject matter described herein.

The antenna radiator comprises a plurality of slots $\mathbf{104}_1$, $\mathbf{104}_2$. In this particular example, each slot is U" shaped. In other examples, the slots 104 can be one or more of:

- straight/"I" shaped (e.g., as shown not least in FIG. 3);
- "L" shaped (e.g., as shown not least in FIG. 4);
- "J" shaped (not shown); and
- meandering (e.g., as shown not least in FIG. 8).

The antenna radiator also comprises a strip portion 101' thereof which extends from the first end $\mathbf{101}_{e1}$ (and first feed point $\mathbf{103}_1$) to the second end $\mathbf{101}_{e2}$ (and the second feed point $\mathbf{103}_2$) of the antenna radiator. The strip portion defines a portion of the antenna radiator which is unbroken (i.e., continuous, uninterrupted, undivided, intact, in one piece, whole, uniform and/or complete) and devoid of slots.

A direct current (DC) could "theoretically" flow between the first and the second feed points $\mathbf{103}_1$ $\mathbf{103}_2$ via the strip portion 101' (i.e., there is an uninterrupted conductive path between the two feed points). This is not to say that, in examples of the disclosure, a DC current is applied to the antenna radiator when the antenna radiator is deployed in an electronic device which is in use by an end user, but merely to note that there is a galvanically conductive strip 101' extending from the first feed point $\mathbf{103}_1$ to the second feed point $\mathbf{103}_2$.

The antenna radiator has a plurality of "U" shaped slots $\mathbf{104}_1$ (e.g., apertures within the antenna radiator, such apertures being "through" apertures in that they extend completely through the total thickness of the conductive radiator layer and that in the radiator layer there is an omission of conductive material where the apertures are present) on a first side $\mathbf{101}_{s1}$ of the strip portion; and a plurality of "U" shaped slots $\mathbf{104}_2$ on a second side $\mathbf{101}_{s2}$ of the strip portion. The width of the strip portion can be adjusted to adjust or alter a resonant frequency of the antenna radiator. Modifying the width of the strip portion slightly affects the resonant frequency of the apparatus.

In this example, the plurality of "U" shaped (non-conductive) slots 104 in the antenna radiator defines a plurality of "U" shaped (conductive) loops 105 of the antenna radiator. In particular, the plurality of "U" shaped slots $104_1$ on one side of the strip 101' of the antenna radiator defines a plurality of "U" shaped loops $105_1$ on the side of the strip. Likewise, the plurality of "U" shaped slots $104_2$ on the other side of the strip 101' defines a plurality of "U" shaped loops on the other side of the strip.

The plurality of concentrical arranged "U" shaped slots define a plurality of nested slots, i.e., one slot within one another on one side of the unbroken central strip 101' (which is devoid of slots) of the antenna radiator. Such an arrangement of nested slots thereby defines a plurality of nested loops 105 of the antenna radiator.

In some examples, a separation distance between the first end $101_{e1}$ and the first feeding element $102_1$ is approximately equal to 1/100th of a wavelength corresponding to a centre frequency of an operational range of frequencies of the patch antenna. Likewise, a separation distance between the second end $101_{e2}$ and the second feeding element $102_2$ is approximately equal to 1/100th of the wavelength corresponding to the centre frequency of the operational range of frequencies of the patch antenna.

In some examples, a separation distance between an outermost loop of the plurality of nested loops and a feeding element is less than 1/10th of a wavelength corresponding to a centre frequency of an operational range of frequencies of the patch antenna. In some examples, the separation distance is between 1/100th and 1/10th of a wavelength corresponding to a centre frequency of an operational range of frequencies of the patch antenna.

The shape, arrangement and/or relative positioning of each of:

the antenna radiator;
the feed elements;
the feed points;
the plurality of slots;
the plurality of loops; and
the strip portion of the antenna radiator are configured to be reflectionally and/or rotationally symmetric.

For instance, two straight "I" shapes slots are provided in each quadrant of the antenna radiator and concentrically arranged in a rotationally and reflectionally symmetric pattern (e.g., reflectionally symmetric about a central longitudinal axis A-A so as to have mirror symmetry about A-A, as well as mirror symmetry about a about a central transverse axis).

FIG. 2 shows specific example dimensions (in mm) of various parts of the patch antenna 100. However, as will be well appreciated, these specific example dimensions are merely one possible set of dimensions that could be adopted for the patch antenna. In other example embodiments the dimensions can be different.

The specific example dimensions of FIG. 2 are configured for the patch antenna being used for transmitting and/or receiving electromagnetic radiation for an operational range of frequencies whose centre frequency is in the order of GHz. It will be appreciated that one or more of the dimensions of the apparatus and/or patch antenna, as well as parts thereof, can be duly adapted to one or more intended operational frequency ranges and centre frequencies thereof. For instance, the length and/or width of the patch antenna can be duly adapted to one or more intended operational frequency ranges and centre frequencies thereof. Moreover, the length and/or width of any: strips, slots and/or loops of the patch antenna can likewise be duly adapted to one or more intended operational frequency ranges and centre frequencies thereof.

One or more of the features discussed in relation to FIG. 2 can be found in one or more of the other FIGS. 3-20 and 32.

Certain of the illustrated patch antennas in FIGS. 3-20 and 32 are shown with reference to specific dimensions (in mm). However, as will be readily appreciated, any dimensions shown are merely example dimensions that could be used. In other examples, the dimensions can be different.

The dimensions can be duly configured used for transmitting and/or receiving electromagnetic radiation for an operational range of frequencies, e.g., not least whose centre frequency is of the order of GHz. It will be appreciated that one or more of the dimensions (not least one or more of: length and width of the patch antenna itself, as well as the widths and/or lengths of the slots and/or loops thereof) can be duly adapted to one or more intended operational frequency ranges and centre frequencies thereof.

Figure 3:
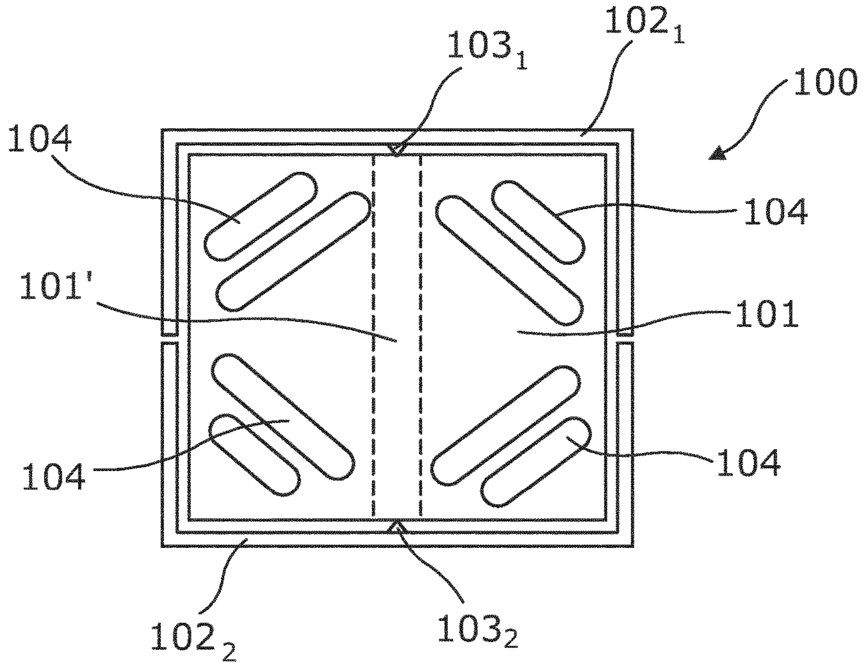
FIG. 3 shows another example of the subject matter described herein.

FIG. 3 illustrates a further example of a patch antenna 100, similar to that as previously described with reference to FIG. 2, for use with the apparatus 10 of FIG. 1. The description provided with reference to FIGS. 1 and 2 is also relevant to FIG. 3.

The patch antenna 100 comprises: an antenna radiator 101; first and second feed elements $102_1$, $102_2$; first and second feed points $103_1$, $103_2$. The patch antenna 100 also comprises a strip portion 101' that extends between the first and second feed elements (and also extends between the first and second feed points).

The patch antenna of FIG. 3 is broadly similar to that of FIG. 2, except that instead of "U" shaped slots, the slots 104 are straight "I" shaped slots. In this specific example, 2 "I" shaped slots are provided in each quadrant of the antenna radiator.

Figure 4:
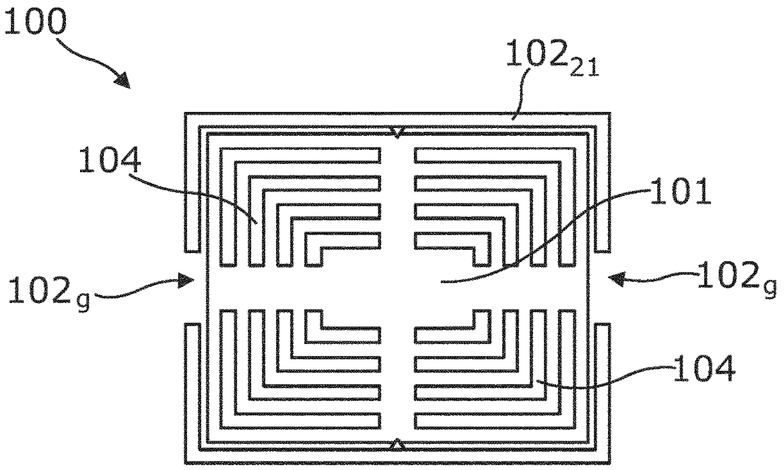
FIG. 4 shows another example of the subject matter described herein.

FIG. 4 illustrates a further example of a patch antenna 100, similar to that as previously described with reference to FIG. 2, for use with the apparatus 10 of FIG. 1. The description provided with reference to FIGS. 1 and 2 is also relevant to FIG. 4.

The patch antenna of FIG. 4 is broadly similar to that of FIG. 2, except that instead of "U" shaped slots, the slots 104 are straight "L" shaped slots. In this specific example, 4 slots are provided in each quadrant of the antenna radiator 101, each of which is "L" shaped and concentrically arranged in a rotationally and reflectionally symmetric pattern. In addition to the longitudinally extending strip portion (which extends from a first end to a second end of the antenna radiator, that is unbroken and devoid of slots) the patch antenna comprises a further strip portion, which extends from a first side to a second side of the antenna radiator, that is unbroken and devoid of slots. The strip portion extends along a central longitudinal axis of the patch antenna whereas the further strip portion extends along a central transverse axis.

In the patch antenna of FIG. 4, the gap $102_g$ between adjoining/proximal sections the first and second "U" shaped feed elements (which together substantially surround/enclose the antenna radiator) is larger than the gap $102_g$ of FIG. 2. Adjustment of the gap size adjusts the matching of the patch antenna.

Figure 5:
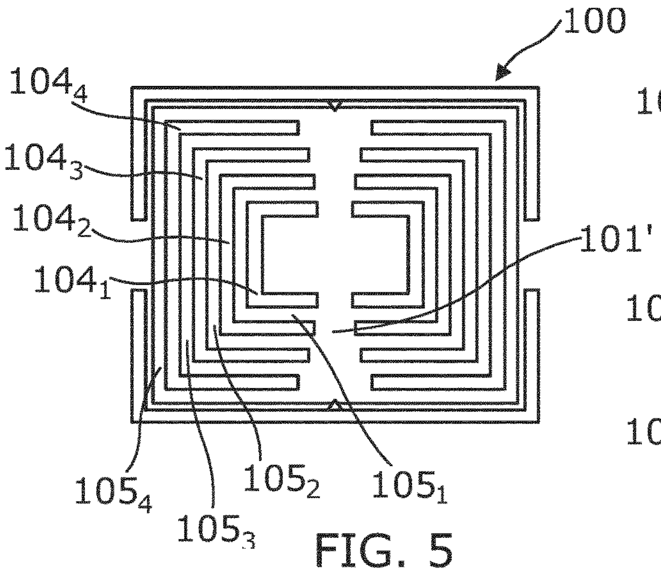
FIG. 5 shows another example of the subject matter described herein.

FIG. 5 illustrates a further example of a patch antenna 100 for use with the apparatus 10 of FIG. 1.

In this example, the plurality of slots $104_1$-$104_4$ in the antenna radiator are "U" shaped and define a plurality of loops $105_1$-$105_4$ of the antenna radiator.

The plurality of concentrical arranged "U" shaped slots $104_1$-$104_4$ are provided nested within one another on one side of the unbroken central strip 101' (which is devoid of slots) of the antenna radiator. Such an arrangement of nested slots thereby defines a plurality of nested loops $105_1$-$105_4$ of the antenna radiator.

Due to the differing lengths of the slots, the width of the unbroken central strip 101' tapers outwards and its width increases towards the first (upper) and second (lower) edges.

The perimeter of the antenna radiator is defined by an outermost loop $105_4$ of the plurality of nested loops that is "U" shaped.

In the example shown, each loop has the same width and each slot has the same width (the slot width corresponding to loop separation distance). As will be discussed below, in other examples, the width and/or lengths of the loops and/or slots may vary, as does their relative arrangement and position within the antenna radiator.

Figure 6:
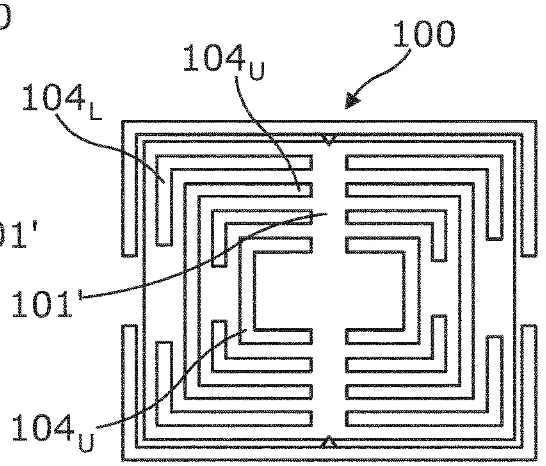
FIG. 6 shows another example of the subject matter described herein.
Figure 7:
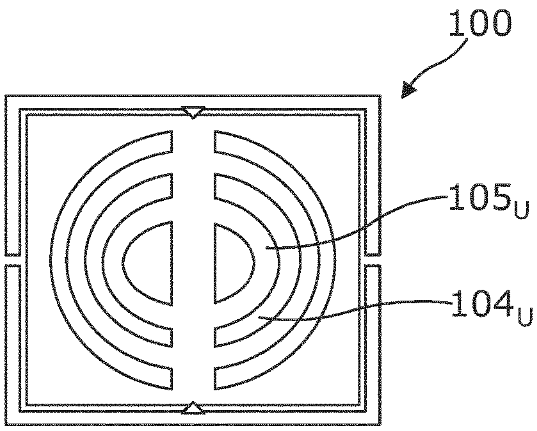
FIG. 7 shows another example of the subject matter described herein.

FIG. 6 illustrates a further example of a patch antenna 100 for use with the apparatus 10 of FIG. 1. In this example, the plurality of slots $104_L$ and $104_U$ provided on each side of the unbroken central strip 101', have each of "L" and "U" shaped slots respectively. The concentric "U" shaped slots define nested loops of the antenna radiator, and the "L" shaped slots define "L" shaped slots within the loops FIG. 7 illustrates a further example of a patch antenna 100 for use with the apparatus 10 of FIG. 1. In this example, the plurality of slots, provided on each side of the unbroken central strip 101', have a more pronounced curve (rather than the rectilinear U-shaped slots of, e.g., FIGS. 2 and 5), thereby providing a set of concentric nested (curved/rounded) "U" shaped nested slots $104_U$ which define "U" shaped concentric nested loops $105_U$ of the antenna radiator.

FIG. 8 illustrates a further example of a patch antenna 100 for use with the apparatus 10 of FIG. 1. In this example, a plurality of meandering nested slots 104 is provided on each side of the unbroken central strip 101'. The plurality of meandering nested slots 104 define a plurality of meandering nested loops 105 of the antenna radiator.

FIG. 9 illustrates a further example of a patch antenna 100 for use with the apparatus 10 of FIG. 1. In this example, "I" shaped first and second feeding elements $102_1$ and $102_2$ are provided at either end of the antenna radiator 101 (which is defined by a central unbroken strip portion 101', on each side of which there is provided a plurality of nested loops $105_1$ and $105_2$ within an outermost loop $105_3$).

Figure 10:
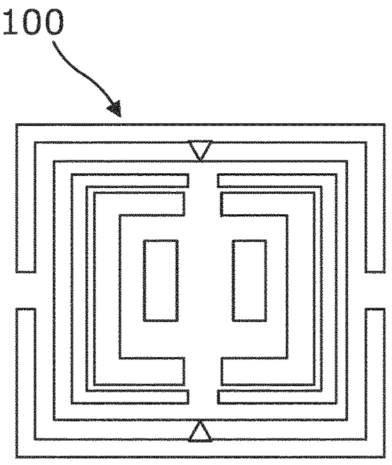
FIG. 10 shows another example of the subject matter described herein.

FIG. 10 illustrates a further example of a patch antenna 100 for use with the apparatus 10 of FIG. 1, wherein the dimensions of the widths of each of the loops varies and likewise wherein the dimensions of the widths of each of the slots (i.e., each loop separation distance) varies. In this example, the patch antenna 100 has U-shaped feed elements.

Figure 11:
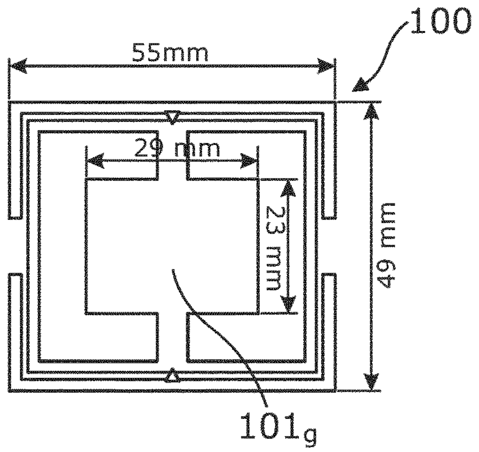
FIG. 11 shows another example of the subject matter described herein.

FIG. 11 illustrates a further example of a patch antenna 100 for use with the apparatus 10 of FIG. 1, wherein the inner most section of the antenna radiator 101, on either side of the central strip 101', comprises a uniform area i.e., an unbroken central planar area 101' devoid of slots (i.e., rather than one or more nested loops such as in not least FIG. 2). In this example, such an unbroken central planar area devoid of slots on either side of the central strip is defined by a rectangular region of conductive material on each side of the central strip. The central strip 101' has, on each side, a single loop 105. In this example, the patch antenna 100 has U-shaped feed elements.

Figure 12:
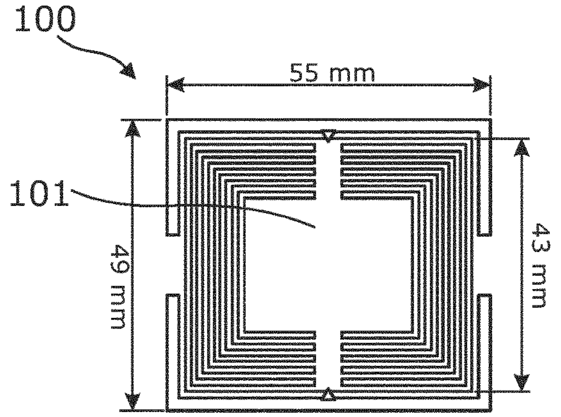
FIG. 12 shows another example of the subject matter described herein.

FIG. 12 illustrates a further example of a patch antenna 100 for use with the apparatus 10 of FIG. 1, wherein, as with FIG. 11, the inner most section of the antenna radiator 101, on either side of the central strip 101', comprises an unbroken central planar rectangular area devoid of slots. The antenna radiator further comprises a plurality of nested loops 105 surrounding the central planar rectangular area.

Figure 13:
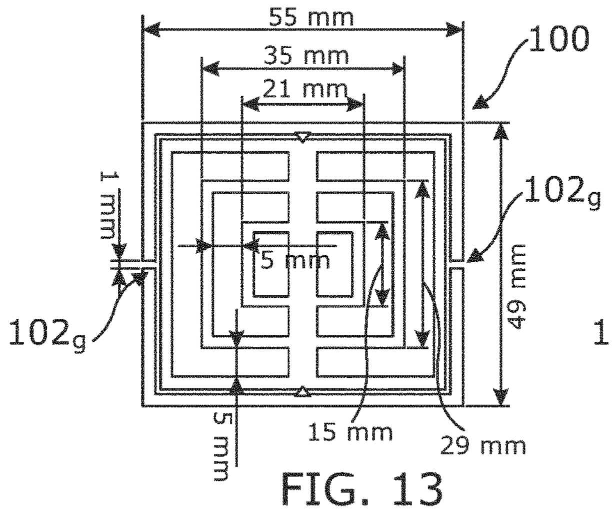
FIG. 13 shows another example of the subject matter described herein.
Figure 14:
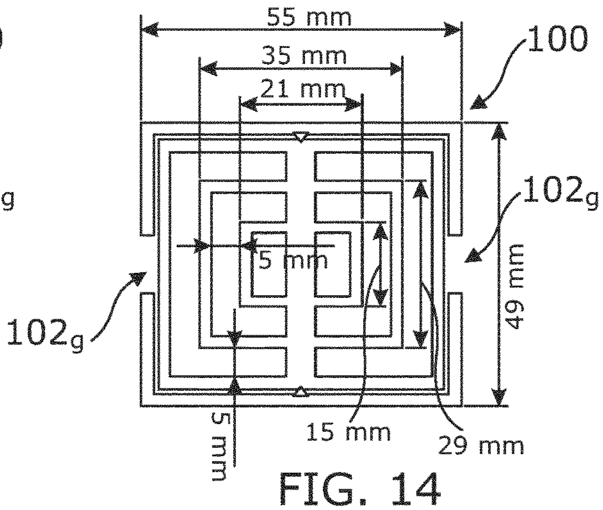
FIG. 14 shows another example of the subject matter described herein.

FIGS. 13 and 14 illustrate two further examples of patch antennas 100 and 100 that are substantially similar to one another, except with regards to the gap $102_g$ between adjoining/proximal sections of the first and second feed elements $102_1$, $102_2$. For the patch antenna 100 of FIG. 13, the gap $102_g$ is 1 mm (i.e., approximately 1/50 of the length/width of the patch antenna), whereas the gap $102_g$ for the patch antenna 100 of FIG. 14 is 10 mm (i.e., approximately 1/5 of the length/width of the patch antenna).

Figure 15:
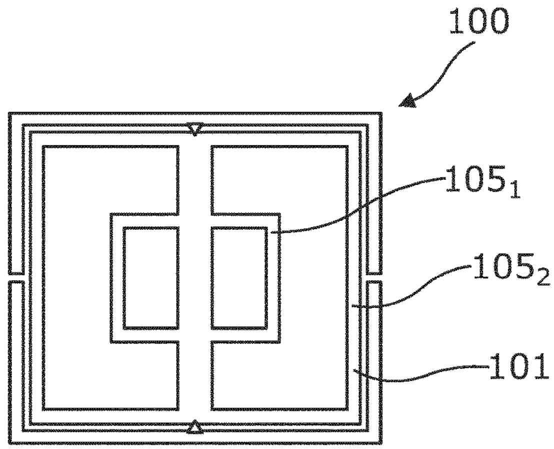
FIG. 15 shows another example of the subject matter described herein.

FIG. 15 illustrates a further example of a patch antenna 100. In this example, the antenna radiator 101 is defined by: a longitudinally extending unbroken central strip 101', each side of which has a single nested loop $105_1$ within an outermost loop $105_2$.

Figure 16:
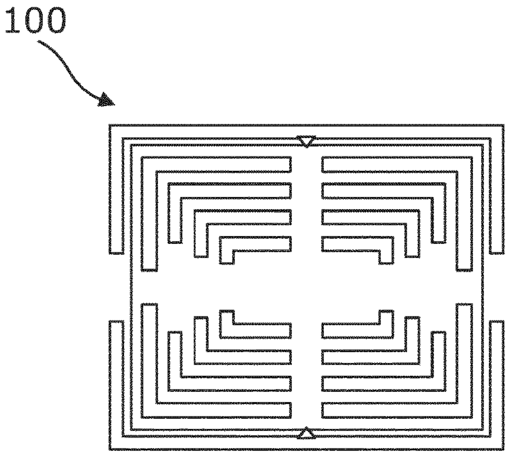
FIG. 16 shows another example of the subject matter described herein.

FIG. 16 illustrates a further example of a patch antenna 100. In this example, the patch antenna 100 has a plurality of "L" shaped slots of differing lengths, that are configured to provide both a longitudinally extending unbroken central strip as well as a transversely extending unbroken central strip.

Figure 17:
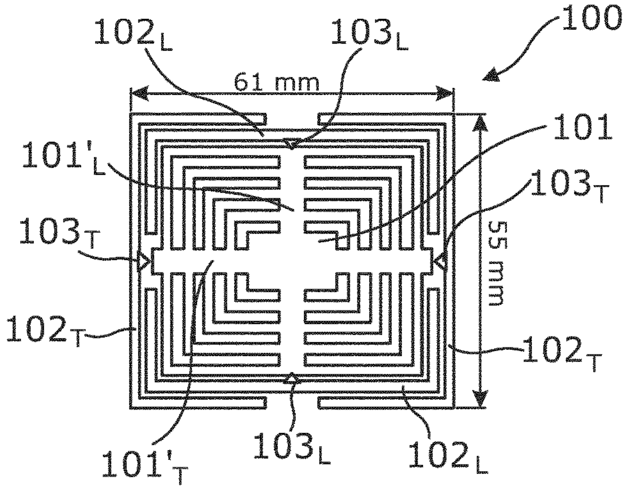
FIG. 17 shows another example of the subject matter described herein.

FIG. 17 illustrates a further example of a patch antenna 100. In this example, the patch antenna 100 comprises a first pair of "U" shaped feeding elements $102_L$, which substantially surround an antenna radiator 101. The patch antenna 100 also comprises a first pair of feeding points $103_L$ that respectively couple first and second radio frequency signals to: first and second ends of a longitudinally extending unbroken central strip $101'_L$ of the antenna radiator 101, and the first and second feed elements $102_L$. Moreover, the patch antenna 100 further comprises a second pair of "U" shaped feeding elements $102_T$ which substantially surround the first pair of feeding elements $102_L$. A second pair of feeding points $103_T$ is provided that respectively couple third and fourth radio frequency signals to: first and second ends of a transversely extending unbroken central strip $101'_T$ of the antenna radiator, and the third and fourth feed elements $102_T$.

Figure 18:
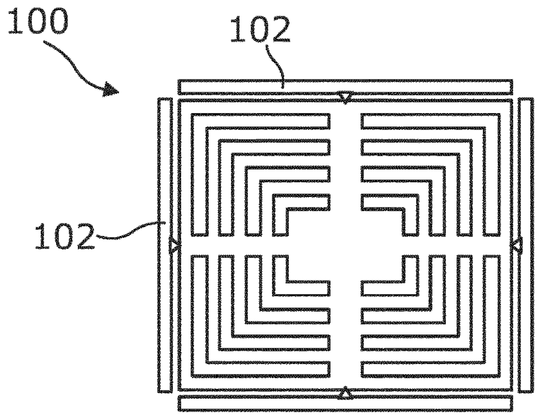
FIG. 18 shows another example of the subject matter described herein.

FIG. 18 illustrates a further example of a patch antenna 100, broadly similar to that of FIG. 17, with two pairs of feeding elements 102 and two pairs of feed points 103, differing in that the pairs of feeding elements are "I" shaped.

Figure 19:
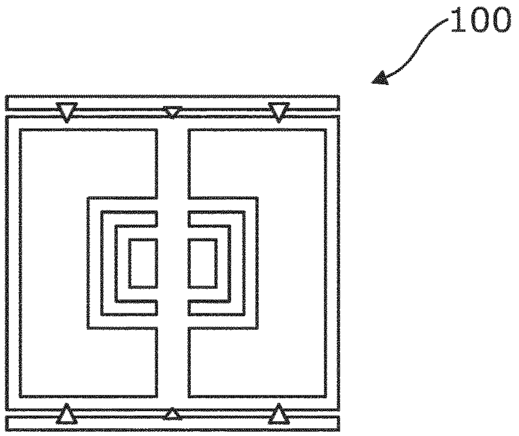
FIG. 19 shows another example of the subject matter described herein.

FIG. 19 illustrates a further example of a patch antenna 100 with a pair of "I" shaped feeding elements 102 and a plurality of pairs of feeding points 103. Each of the plurality of pairs of feeding points couples first and second radio frequency signals to: first and second ends of the antenna radiator and the first and second feeding points of the pair of feeding points.

Figure 20:
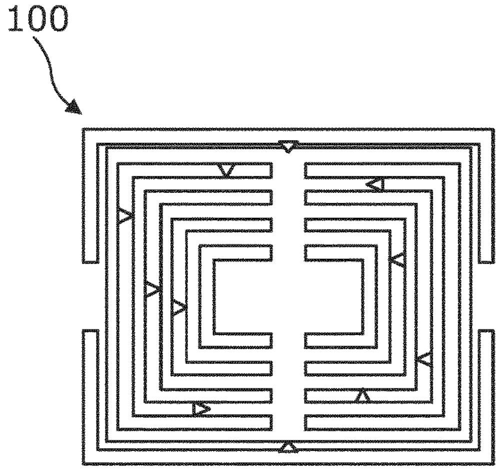
FIG. 20 shows another example of the subject matter described herein.

FIG. 20 illustrates a further example of a patch antenna 100 comprising first and second feed points 103 to couple first and second radio frequency signals to first and second ends of the antenna radiator 101 as well as the first and second feed elements 102 respectively. The patch antenna 100 also a further plurality of feed points to couple frequency signals between the loops of nested loops of the antenna radiator.

Figure 21:
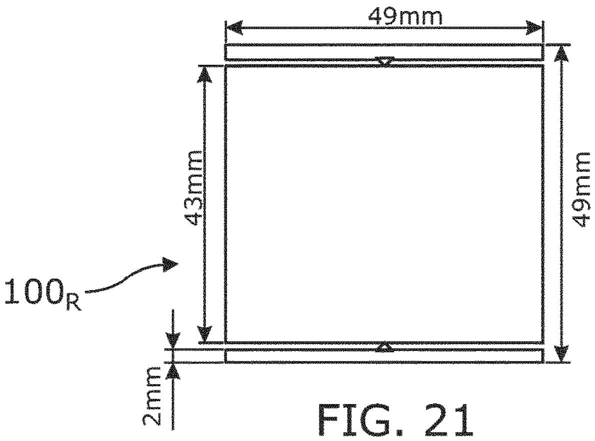
FIG. 21 shows another example of the subject matter described herein.

Reference will now be made to simulations carried out using an antenna design in accordance with an example of the present disclosure (e.g., a proposed antenna patch 100 as shown in FIG. 2) and simulations carried out using a similarly dimensioned reference antenna design, albeit one not in accordance with examples of the present disclosure (e.g., antenna patch 100R as shown in FIG. 21).

The proposed patch antenna 100, e.g., as shown in FIG. 2, has a resonance frequency of 2.6 GHz. The outer dimensions of the proposed patch antenna are about 0.48λ×0.43λ (at 2.6 GHz). In this example case, the proposed antenna is fed with two capacitive "U" shaped feeding elements which are placed on upper and lower ends of an antenna radiator. The antenna radiator and feeding elements are fed with two feeding ports in a collaborative manner. The antenna radiator contains slots and loops. The antenna radiator has a straight unbroken conductive strip between the feeding ports. The antenna radiator also includes at least two symmetric loops inside each other. The size of the antenna radiator is approximately λ/2, where λ=a wavelength of a frequency corresponding to a central frequency of the operational bandwidth of the antenna structure. The height of the entire antenna structure (i.e., thickness of the ground plane, thickness of the patch antenna and separation distance therebetween) is less than λ/10.

Since the design is symmetric, the first and second feeding signals for the first and second feeding points have equal amplitudes but opposite phases (e.g., an equal excitation vector (1/√2) and 180° phase shift). In the proposed design, by using at least two loops, where one loop is inside the other (i.e., nested), the SAR pattern will be spread (see FIG. 26) and the maximum SAR also decreases significantly (from 11.0 W/kg to 5.0 W/kg—see FIG. 30).

FIG. 21 illustrates the dimensions and geometry of a design of a reference patch antenna 100R not in accordance with examples of the present disclosure. The reference patch antenna 100R has a resonance frequency of 3.3 GHZ.

Figure 22:
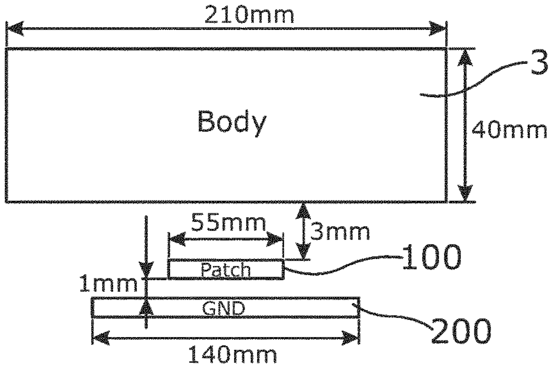
FIG. 22 shows another example of the subject matter described herein.
Figure 23:
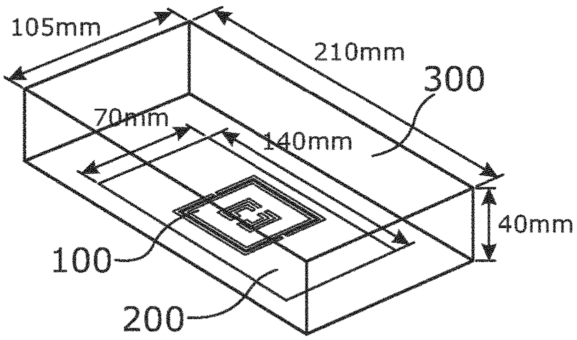
FIG. 23 shows another example of the subject matter described herein.

FIGS. 22 and 23 illustrate an overview of the antenna system (i.e., patch antenna 100 and ground plane 200) and human body tissue model 300 setup that was used in the simulations. For the simulation of each of: the proposed patch antenna (100 of FIG. 2), and the reference patch antenna (100R of FIG. 21); the proposed/reference patch antenna is overlayed the ground plane and a block of body tissue is overlayed the proposed/reference patch antenna. The block of body tissue is modeled as a homogenous fat block-density $\rho$=911 kg/m$^3$, relative permittivity $\varepsilon$=10.6, conductivity $\sigma$=0.389 s/m. The distance between the block of body tissue and the antenna patch is 3 mm (~<0.03λ) and the height of each antenna patch above the ground is 1 mm (~<0.01λ). The sizes of the block of body tissue and the ground plane (GND) are the same in each simulation. Also, the distance from the antenna patch and the body block is the same for each simulation.

Figure 24:
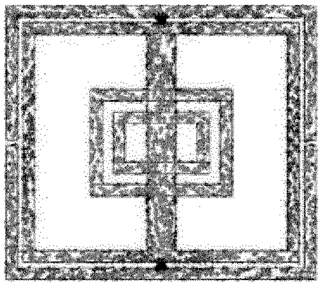
FIG. 24 shows another example of the subject matter described herein.
Figure 25:
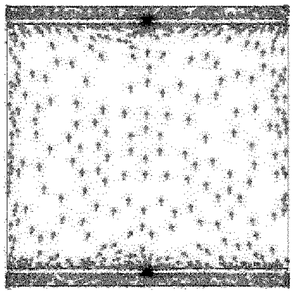
FIG. 25 shows another example of the subject matter described herein.

FIGS. 24 and 25 illustrate the surface currents on the proposed and reference antenna patches respectively at their respective resonance frequencies: proposed antenna patch design at 2.575 GHZ, and the reference antenna patch design at 3.3 GHZ.

Figure 26:
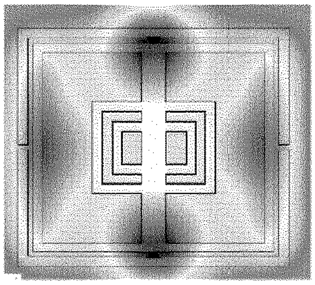
FIG. 26 shows another example of the subject matter described herein.
Figure 27:
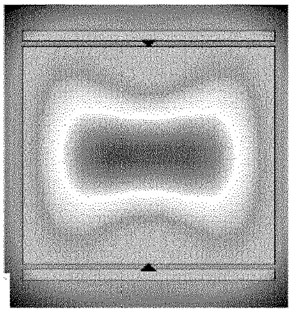
FIG. 27 shows another example of the subject matter described herein.

FIGS. 26 and 27 illustrate the SAR distributions of the proposed and reference patch antennas at their respective resonance frequencies.

FIG. 26 illustrates the SAR distributions of the proposed patch antenna at its resonance frequency (2.575 GHZ) showing its butterfly-shaped SAR pattern, distributed over a wider area than that of the reference patch antenna, having maximum SAR values of the order of 5 W/kg. Whereas, FIG. 27 illustrates the SAR distribution of the reference patch antenna at its resonance frequency (3.3 GHZ) showing its center-focused SAR pattern having a maximum SAR value of the order of 10 W/kg. The SAR of the reference design is over twice as large as in the proposed design while, as shown in FIG. 29, their total efficiencies are about the same.

Figure 28:
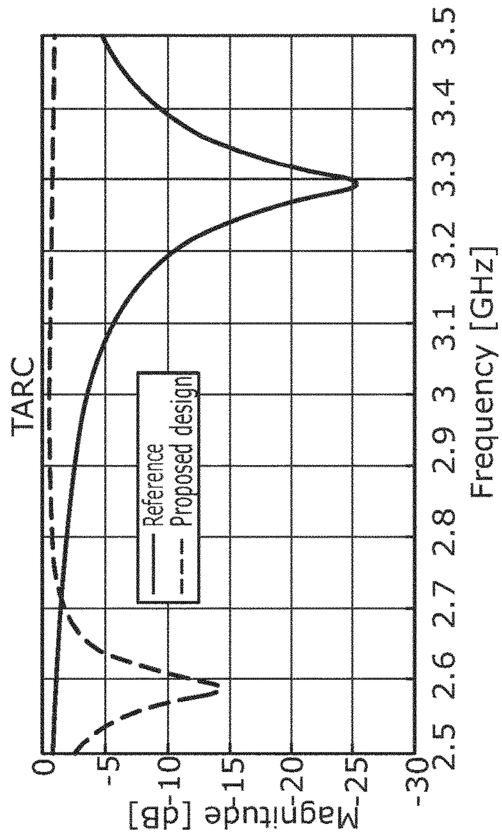
FIG. 28 shows another example of the subject matter described herein.

FIG. 28 shows the Total Active Reflection Coefficient (TARC) of each antenna design. The reference antenna achieves better matching (lower TARC) and wider bandwidth than the proposed one. However, the bandwidth of the proposed antenna is nevertheless adequate. The proposed antenna is matched at about 700 MHz lower frequency than the reference one indicating smaller electrical size.

Figure 29:
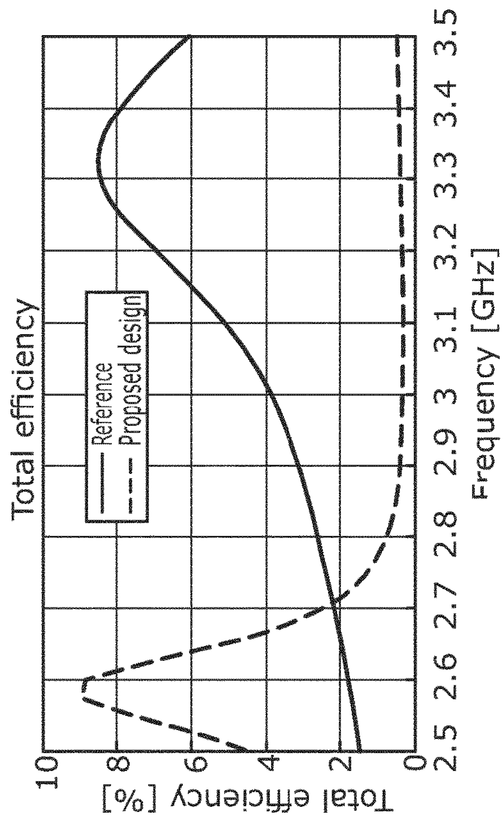
FIG. 29 shows another example of the subject matter described herein.

FIG. 29 shows the total efficiency of each antenna design. The maximum values of the total efficiency of the reference and proposed design are about the same: 8.4% and 9.0%.

Figure 30:
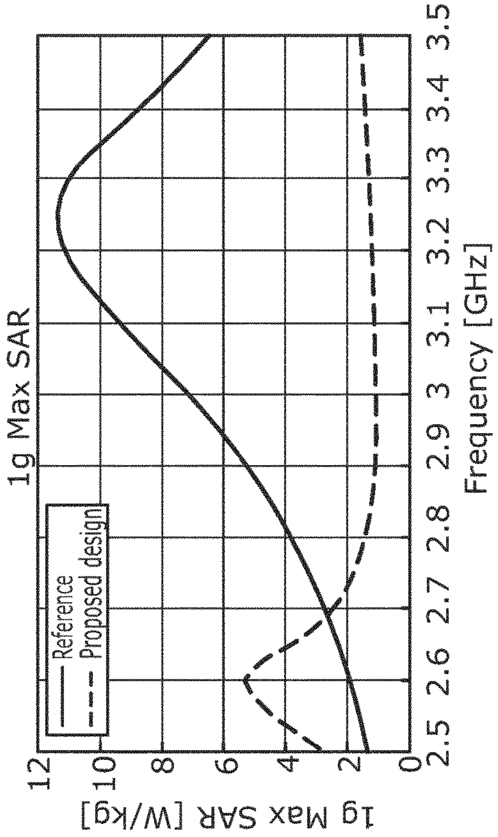
FIG. 30 shows another example of the subject matter described herein.

FIG. 30 shows the 1 g maximum SAR values for each antenna design. The maximum SAR value for the reference design is of the order of 11 W/kg, whereas the maximum SAR value for the proposed design is 5.0 W/kg. The SAR of the reference design is over twice as large as in the proposed design.

It is to be appreciated that SAR values for a wireless communications device is an overall device design issue, not just an antenna design issue. A particular device comprising a specific antenna design, which is coupled to transmit capable radio frequency electronic circuitry, will need to be tested as a complete unit (i.e., the entire device) and at the highest power levels produced by the transmit circuitry. Usually, the final version of a specific product design is tested, i.e., the mass production version and not the prototype version(s), and these test results are sent to customers (e.g., Mobile Operator companies) for their approval.

Conventionally, to comply with SAR regulations, a transmit power of an antenna system may be lowered at the expense of reduced uplink capacity. Examples of the present disclosure seek to provide an antenna that radiates efficiently and whilst also enabling SAR value(s) to be controlled. The specific antenna designs according to various examples of the present disclosure may assist in a wireless communications device incorporating such antenna designs having SAR value(s) that may be low enough such that it meets the various SAR test limits and which may comply with international safety limits and standards.

A ratio of total efficiency and maximum SAR is used as a Figure of Merit (FoM). A low-SAR-high-efficiency antenna would have a high FoM value.

Figure 31:
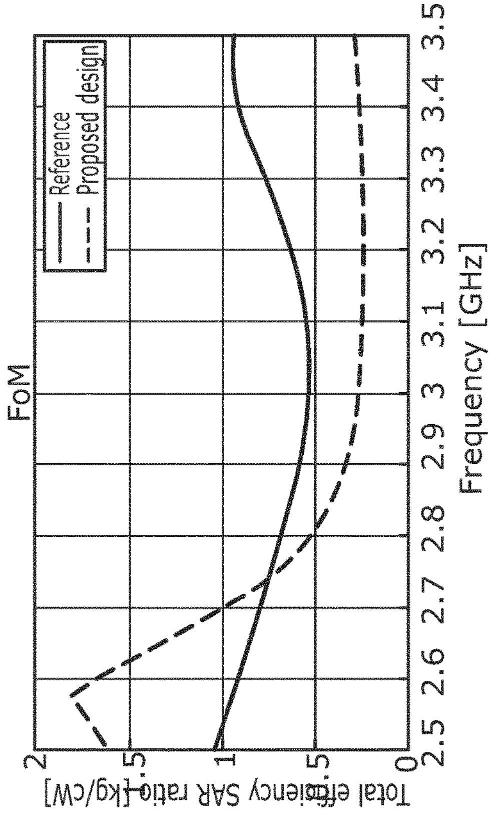
FIG. 31 shows another example of the subject matter described herein.

FIG. 31 shows FoM values for the reference and proposed antenna designs. The FoM value of the proposed antenna at its resonance frequency (2.575 GHZ) is 1.80 kg/cW (kilogram percent-Watt). This FOM value is over two times larger than the FOM value for the reference design, 0.77 kg/cW, at its resonance frequency (3.3 GHZ).

Figure 32:
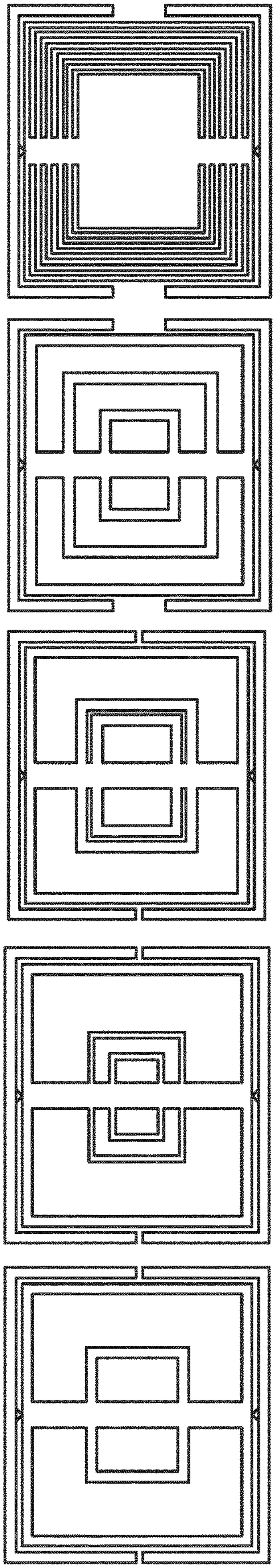
FIG. 32 shows further examples of the subject matter described herein.

FIG. 32 *a*) to *e*) illustrates alternative possible antenna designs, each exhibiting low SAR characteristics. Common features of these antenna designs include:

- there being at least two loops symmetrically on the left and right sides of a straight unbroken conductive strip between the feeding points,
- the outermost loop being unbroken, and
- two capacitive "U" shaped feeding elements located outside of the antenna radiator.

In a) the outer loop is separated from the inner loop by a separation distance approximately 0.1λ. In b), the second most outer loop is separated from the outermost loop by a separation distance approximately 0.1λ.

In b) and c), the first and second inner loops, i.e., the smallest loops, can be closer to one another than to the outer most loop.

The loop separation distance between the second most outer loop and the outermost loop can be less than 0.1λ, e.g., as in c), d) and e); however, this can reduce the total efficiency and hence reduces the FoM.

The matching of a patch antenna can be improved by reducing the gap between the "U" shaped feeding elements (see for instance the gap of d) and e) as compared to the gap for a) to c).

The table below shows various key parameters of:

a reference antenna, i.e., as per FIG. 21;

an example of a proposed antenna, i.e., as per FIG. 2; and examples of alternative antenna designs, i.e., as per FIG. 32*a*)-*e*) at their resonance frequencies.

| Case | Resonant Frequency [GHz] | TARC Min [dB] | Total Efficiency [%] | SAR [W/kg] | FoM [kg/cW] |
|---|---|---|---|---|---|
| reference antenna | 3.3 | −25 | 8.4 | 11 | 0.77 |
| proposed antenna | 2.58 | −14 | 9.0 | 5.0 | 1.80 |
| alternative antenna a) | 2.58 | −12 | 8.7 | 5.0 | 1.74 |
| alternative antenna b) | 2.58 | −12 | 8.7 | 4.9 | 1.78 |
| alternative antenna c) | 2.62 | −23 | 9.3 | 5.7 | 1.63 |
| alternative antenna d) | 2.6 | −6 | 6.8 | 4 | 1.70 |
| alternative antenna e) | 2.6 | −20 | 8.5 | 6.5 | 1.31 |

In some examples, the antenna designs described above may include the following alternative features:

the antenna radiator may include slots of different shapes, e.g., U-, L-, J- and I-shaped;

a number of slots/loops can be higher than two;

the feeding elements can be I-shaped;

a higher number of feeding points;

a resonance frequency of the antenna patch can be shifted by changing its dimensions;

one or more matching circuits can be used to improve impedance matching and total efficiency;

if a larger number of feeding points are used, the feeding signals for each point can have different values in different frequency ranges to excite different modes; and several antenna radiators and/or antenna patches can be placed on top of a single ground plane to provide a Multiple Input Multiple Output (MIMO) antenna.

Conventional antennas may need to have their transmit power decreased to meet SAR specifications. However, a reduction in transmit power leads to weaker transmitted fields and reduced coverage. Examples of the present disclosure provide an antenna design which, due to its low profile (height of antenna radiator relative to the ground plane), can be placed on the back cover of a mobile device, that exhibits a large ratio of total efficiency and SAR in cases where an antenna is in close proximity of the human body. In other words, the antenna results in low SAR values as compared to other antennas producing equally strong radiated fields.

The antenna designs of the present disclosure can be used in an antenna system of a device, such as for example: user equipment (UE), a wireless communications device, a hand-portable electronic device, a client device, a mobile cellular telephone, a location/position tag, a hyper tag etc.

In one example, the apparatus is embodied on a hand held portable electronic device, such as a mobile telephone or smartphone, wearable computing device or personal digital assistant, that can additionally provide one or more audio/text/video communication functions (for example tele-communication, video-communication, and/or text transmission (Short Message Service (SMS)/Multimedia Message Service (MMS)/emailing) functions), interactive/non-interactive viewing functions (for example web-browsing, navigation, TV/program viewing functions), music recording/playing functions (for example Moving Picture Experts Group-1 Audio Layer 3 (MP3) or other format and/or (frequency modulation/amplitude modulation) radio broadcast recording/playing), downloading/sending of data functions, image capture function (for example using a (for example in-built) digital camera), and gaming functions.

The above described examples may find application as enabling components of: wireless communication devices, tracking systems, automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things (IoT); Vehicle-to-everything (V2X), virtualized networks; and related software and services.

The apparatus can be provided in an electronic device, for example, a mobile terminal, according to an example of the present disclosure. It should be understood, however, that a mobile terminal is merely illustrative of an electronic device that would benefit from examples of implementations of the present disclosure and, therefore, should not be taken to limit the scope of the present disclosure to the same. While in certain implementation examples, the apparatus can be provided in a mobile terminal, other types of electronic devices, such as, but not limited to, hand portable electronic devices, wearable computing devices, portable digital assistants (PDAs), pagers, mobile computers, desktop computers, televisions, gaming devices, laptop computers, cameras, video recorders, GPS devices and other types of electronic systems, can readily employ examples of the present disclosure. Furthermore, devices can readily employ examples of the present disclosure regardless of their intent to provide mobility.

Although specific terms are employed herein, they are used in a generic and descriptive sense only and not for purposes of limitation.

Features described in the preceding description can be used in combinations other than the combinations explicitly described.

Although functions have been described with reference to certain features, those functions can be performable by other features whether described or not.

Although features have been described with reference to certain examples, those features can also be present in other examples whether described or not. Accordingly, features described in relation to one example/aspect of the disclosure can include any or all of the features described in relation to another example/aspect of the disclosure, and vice versa, to the extent that they are not mutually inconsistent.

Although various examples of the present disclosure have been described in the preceding paragraphs, it should be appreciated that modifications to the examples given can be made without departing from the scope of the invention as set out in the claims. For instance, the specific dimensions illustrated in the figures of certain examples of the antenna designs can be duly adapted to suit a desired operational range and central frequency thereof.

The term 'comprise' is used in this document with an inclusive not an exclusive meaning. That is any reference to X comprising Y indicates that X can comprise only one Y or can comprise more than one Y. If it is intended to use 'comprise' with an exclusive meaning then it will be made clear in the context by referring to "comprising only one . . . " or by using "consisting".

In this description, the wording 'connect', 'couple' and 'communication' and their derivatives mean operationally connected/coupled/in communication. It should be appreciated that any number or combination of intervening components can exist (including no intervening components), i.e., so as to provide direct or indirect connection/coupling/communication. Any such intervening components can include hardware and/or software components.

In this description, the wording 'approximately', i.e., in the context of one parameter value being approximately equal to a certain value (e.g. a dimension of the apparatus being approximately $x\lambda$ antenna) may correspond to the parameter value differing from the certain value by an amount within a threshold level, wherein the threshold level is not least for example <1%, 5%, 10%, or 25%.

In this description, reference has been made to various examples. The description of features or functions in relation to an example indicates that those features or functions are present in that example. The use of the term 'example' or 'for example', 'can' or 'may' in the text denotes, whether explicitly stated or not, that such features or functions are present in at least the described example, whether described as an example or not, and that they can be, but are not necessarily, present in some or all other examples. Thus 'example', 'for example', 'can' or 'may' refers to a particular instance in a class of examples. A property of the instance can be a property of only that instance or a property of the class or a property of a sub-class of the class that includes some but not all of the instances in the class.

In this description, references to "a/an/the" [feature, element, component, means . . . ] are to be interpreted as "at least one" [feature, element, component, means . . . ] unless explicitly stated otherwise. That is any reference to X comprising a/the Y indicates that X can comprise only one Y or can comprise more than one Y unless the context clearly indicates the contrary. If it is intended to use 'a' or 'the' with an exclusive meaning then it will be made clear in the context. In some circumstances the use of 'at least one' or 'one or more' can be used to emphasise an inclusive meaning but the absence of these terms should not be taken to infer any exclusive meaning.

The presence of a feature (or combination of features) in a claim is a reference to that feature (or combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavouring in the foregoing specification to draw attention to those features of examples of the present disclosure believed to be of particular importance it should be understood that the applicant claims protection in respect of any patentable feature or combination of features hereinbefore referred to and/or shown in the drawings whether or not particular emphasis has been placed thereon.

The examples of the present disclosure and the accompanying claims can be suitably combined in any manner apparent to one of ordinary skill in the art. Separate references to an "example", "in some examples" and/or the like in the description do not necessarily refer to the same example and are also not mutually exclusive unless so stated and/or except as will be readily apparent to those skilled in the art from the description. For instance, a feature, structure, process, step, action, or the like described in one example may also be included in other examples, but is not necessarily included.

Each and every claim is incorporated as further disclosure into the specification and the claims are embodiment(s) of the present disclosure. Further, while the claims herein are provided as comprising specific dependencies, it is contemplated that any claims can depend from any other claims and that to the extent that any alternative embodiments can result from combining, integrating, and/or omitting features of the various claims and/or changing dependencies of claims, any such alternative embodiments and their equivalents are also within the scope of the disclosure.

We claim:

1. An apparatus comprising:

an antenna radiator having a first end and a second end;

a ground plane spaced from the antenna radiator;

a first feed element and a second feed element;

a first feed point configured to couple a first radio frequency signal to the first end of the antenna radiator and the first feed element;

a second feed point configured to couple a second radio frequency signal to the second end of the antenna radiator and the second feed element;

wherein the first and second feed elements are configured to electromagnetically couple to the antenna radiator; and wherein the antenna radiator comprises:

a strip portion, which extends from the first end to the second end of the antenna radiator, that is unbroken and devoid of slots;

a plurality of slots on a first side of the strip portion; and a plurality of slots on a second side of the strip portion.

2. The apparatus of claim 1, wherein a phase of the second radio frequency signal is configured to be:

different to a phase of the first radio frequency signal; and/or opposite to a phase of the first radio frequency signal.

3. The apparatus of claim 1, wherein an amplitude of the second radio frequency signal is configured to be the same as an amplitude of the first radio frequency signal.

4. The apparatus of claim 1, wherein an amplitude of the second radio frequency signal is configured to be different to an amplitude of the first radio frequency signal.

5. The apparatus of claim 1, wherein the apparatus comprises a central transverse axis and a central longitudinal axis, and wherein at least one from a group of the following is reflectionally symmetric about the central transverse axis and/or the central longitudinal axis:
- the apparatus;
- the antenna radiator;
- the first and second feed elements;
- the first and second feed points;
- the plurality of slots; and
- the strip portion of the antenna radiator.

6. The apparatus of claim 1, wherein the apparatus comprises a central point thereof, and wherein at least one from a group of the following is rotationally symmetric about the central point:
- the apparatus;
- the antenna radiator;
- the first and second feed elements;
- the first and second feed points;
- the plurality of slots; and
- the strip portion of the antenna radiator.

7. The apparatus of claim 1, wherein at least one of the first feed element and the second feed element:
- respectively extends along a length of a first and a second edge of the antenna radiator;
- is "I" shaped;
- respectively extends along substantially half the perimeter of the antenna radiator; and/or
- is "U" shaped.

8. The apparatus of claim 1, wherein at least some of the plurality of slots are at least one from a group of:
- "I" shaped;
- "L" shaped;
- "J" shaped;
- "U" shaped; and
- meandering.

9. The apparatus of claim 1, wherein at least one or more of the plurality of slots are configured to be nested slots.

10. The apparatus of claim 1, wherein at least some of the plurality of slots define a plurality of nested loops of the antenna radiator.

11. The apparatus of claim 1, wherein the antenna radiator comprises a plurality of loops on the first side of the strip portion and a plurality of loops on the second side of the strip portion.

12. The apparatus of claim 11, wherein the plurality slots are non-conductive, wherein the plurality of loops are conductive, and wherein the conductive loops of the plurality of conductive loops are separated by non-conductive slots of the plurality of non-conductive slots.

13. The apparatus of claim 11, wherein the plurality of loops define a plurality of nested loops.

14. The apparatus of claim 10, wherein an outermost loop of the plurality of nested loops is "U" shaped.

15. The apparatus of claim 10, wherein a separation distance between an outermost loop of the plurality of nested loops and a second most outer loop of the plurality of nested loops is between $1/10^{th}$ and $1/100^{th}$ of a wavelength corresponding to a centre frequency of an operational range of frequencies of the apparatus.

16. The apparatus of claim 10, wherein a separation distance between an outermost loop of the plurality of nested loops and a feeding element is approximately equal to $1/100^{th}$ of a wavelength corresponding to a centre frequency of an operational range of frequencies of the apparatus.

17. The apparatus of claim 1, wherein a longitudinal dimension and/or a transverse dimension of the apparatus is approximately equal to half of a wavelength corresponding to a centre frequency of an operational range of frequencies of the apparatus.

18. The apparatus of claim 1, wherein the ground plane is comprised in a housing of an energy storage device of a portable wireless communication device.

19. The apparatus of claim 1, wherein at least a part of the apparatus is positioned in a housing for a portable wireless communication device.

20. A portable electronic device comprising one or more apparatuses as claimed in claim 1.

* * * * *